(No Model.)

N. LINSLEY, Dec'd.
F. LINSLEY, Executrix.
TOOL HANDLE.

No. 409,989. Patented Aug. 27, 1889.

Witnesses
Harry S. Rohrer
Schuyler Duryee

Inventor
Newton Linsley
By
Miles & Greene
Attorneys

UNITED STATES PATENT OFFICE.

NEWTON LINSLEY, OF FREEPORT, ILLINOIS; FLORENCE LINSLEY EXECUTRIX OF SAID NEWTON LINSLEY, DECEASED.

TOOL-HANDLE.

SPECIFICATION forming part of Letters Patent No. 409,989, dated August 27, 1889.

Application filed December 19, 1885. Serial No. 186,144. (No model.)

*To all whom it may concern:*

Be it known that I, NEWTON LINSLEY, a resident of Freeport, in the county of Stephenson and State of Illinois, have invented certain new and useful Improvements in Tool-Handles; and I do hereby declare the following to be a full, clear, and exact description of the invention, such as will enable others skilled in the art to which it pertains to make and use the same.

The invention is fully described and claimed in this specification and shown in the accompanying drawings, in which—

Figure 1:
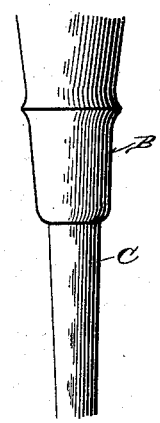
Figure 2:
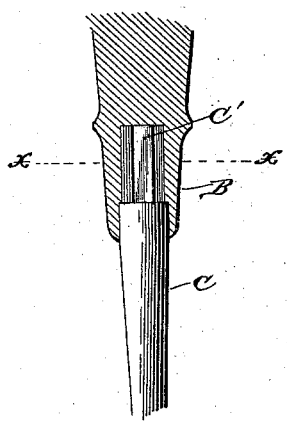
Figure 3:
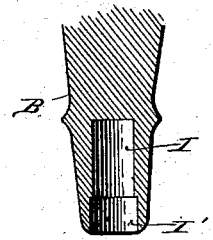
Figure 4:
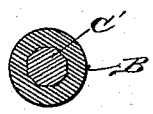

Figure 1 shows the lower portion of a handle with the shank of a tool fixed therein. Fig. 2 is a section through the axis of the handle, the shank being in position. Fig. 3 is a section through the axis of the handle alone. Fig. 4 is a section on the line $x\ x$, Fig. 1.

In the drawings, B is the end of a metallic handle, provided with an axial opening of cylindrical form but having its outer or end portion I' of greater diameter than the remainder I.

C is a cylindrical tool-shank laterally cut away near its end to form a prism whose angles are elements of the original surface of the shank, of which the diameter is equal to the diameter of the outer and larger portion of the recess in the handle. From the construction it is evident that when the shank is inserted in the outer part of the recess in the handle the prismatic angles will meet the shoulder formed at the point where the diameter is diminished; but if the parts be properly proportioned by the application of great force the shank may, nevertheless, be pushed into the diminished part of the recess, its angles cutting their way in the metal. When thus forced into position, the cylindrical part of the shank enters and fits in the part I' of the recess and there remain no visible traces of the securing process; yet the attachment is so firm that if the handle be of iron and the shank of steel the latter may be broken by torsion without its loosening, and its direct withdrawal is practically impossible. Were the outer end of the recess not enlarged the shank would be weak at its junction with the handle, for it is at this point that lateral strain upon the shank is the greatest, and at this point it would be cut away to form the prismatic portion. With this construction, however, the weakening begins at some distance within the supporting-walls of the recess. Again, in the construction supposed, the end of the handle, even if of iron, would be very liable to split when the shank was forced into place if the proportions were such as to require the degree of force that is usually and safely employed practically with the present construction.

What I claim as new, and desire to secure by Letters Patent, is—

The combination, with a handle having a cylindrical socket whose outer portion is of greater diameter than its inner portion, of a tool-shank equal in diameter to said outer portion, and having a prismatic end adapted to readily enter said outer portion, but requiring pressure to force it into said inner portion, substantially as set forth.

In testimony whereof I have signed this specification in the presence of two subscribing witnesses.

NEWTON LINSLEY.

Witnesses:
CHAS. GILBERT,
J. A. CRAIN.